United States Patent
Le et al.

(10) Patent No.: US 7,364,441 B2
(45) Date of Patent: Apr. 29, 2008

(54) LOW-PROFILE PCI ADAPTER CARDS WITH HIGH PORT COUNTS

(75) Inventors: Chinh Le, San Jose, CA (US); Bao Nguyen, San Jose, CA (US); Tam Nguyen, San Jose, CA (US)

(73) Assignee: Lewiz Communications, San Jose, CA (US)

( * ) Notice: Subject to any disclaimer, the term of this patent is extended or adjusted under 35 U.S.C. 154(b) by 0 days.

(21) Appl. No.: 11/476,409

(22) Filed: Jun. 27, 2006

(65) Prior Publication Data

US 2007/0099475 A1     May 3, 2007

Related U.S. Application Data

(60) Provisional application No. 60/694,580, filed on Jun. 27, 2005.

(51) Int. Cl.
*H01R 12/00* (2006.01)

(52) U.S. Cl. ......................... 439/79; 439/368

(58) Field of Classification Search .................. 439/79, 439/92, 368, 939; 361/683, 686, 724
See application file for complete search history.

(56) References Cited

U.S. PATENT DOCUMENTS

| | | | | | |
|---|---|---|---|---|---|
| 4,987,517 | A | * | 1/1991 | Kurz ........................... | 361/683 |
| 5,259,783 | A | * | 11/1993 | Hileman et al. ............ | 439/372 |
| 5,883,790 | A | * | 3/1999 | Klein .......................... | 361/809 |
| 5,986,892 | A | * | 11/1999 | Hargy, III .................... | 361/759 |
| 6,059,615 | A | * | 5/2000 | Pendleton et al. .......... | 439/717 |
| 6,147,874 | A | * | 11/2000 | Burbano et al. ............ | 361/759 |
| 6,315,600 | B1 | * | 11/2001 | Droesbeke .................. | 439/460 |
| 6,661,670 | B1 | * | 12/2003 | Eckberg et al. ............. | 361/752 |

* cited by examiner

*Primary Examiner*—Khiem Nguyen
(74) *Attorney, Agent, or Firm*—Townsend and Townsend and Crew LLP

(57) ABSTRACT

A PCI card comprises upper and lower surfaces; a mounting hole defining first and second holes, the first hole having a larger diameter than the second hole; a stud that is inserted into the mounting hole and flushed to the upper surface; and a port connector provided on the stud to minimize space consumption. The first and second holes are concentric circles. Alternatively, the first and second holes are not perfect circles.

25 Claims, 2 Drawing Sheets

Top side assembly of 4-port, low profile PCI-Express card
(dimensions are in inches)

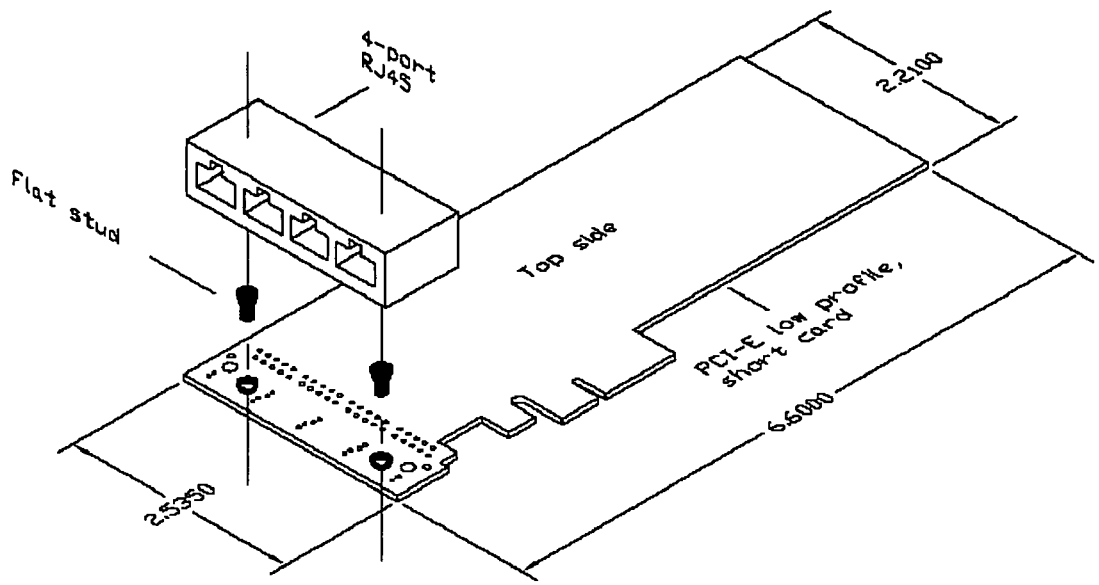
Figure 1: Top side assembly of 4-port, low profile PCI-Express card
(dimensions are in inches)
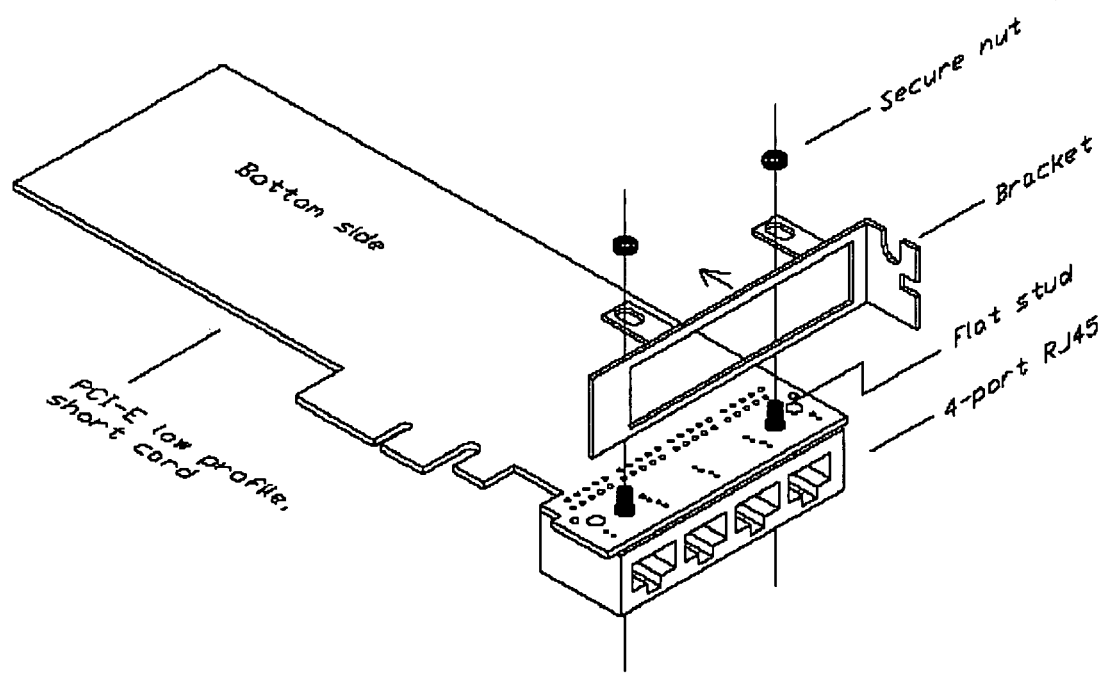
Figure 2: bottom side assembly

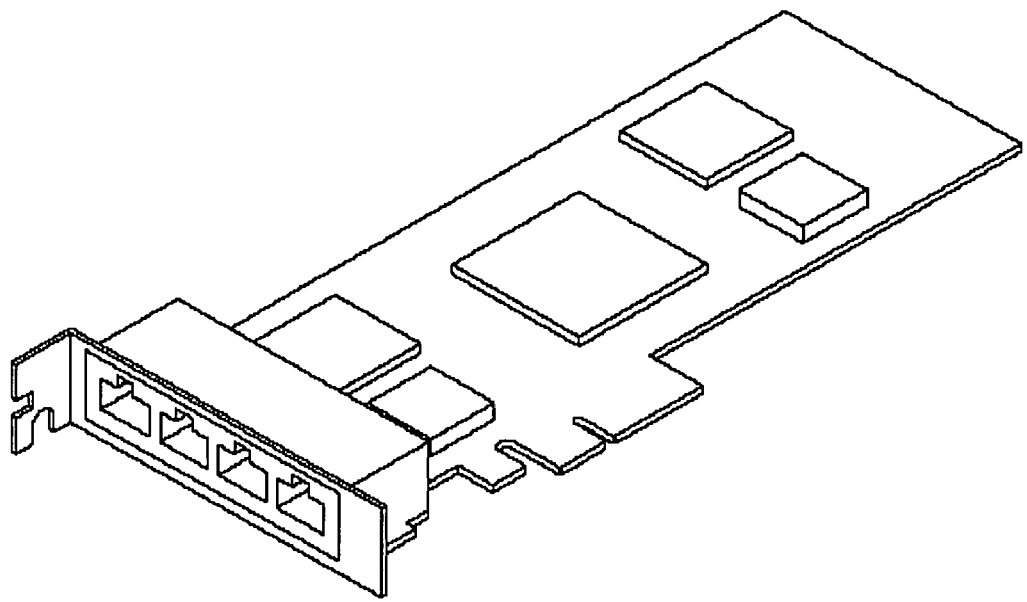
Figure 3: Final top side
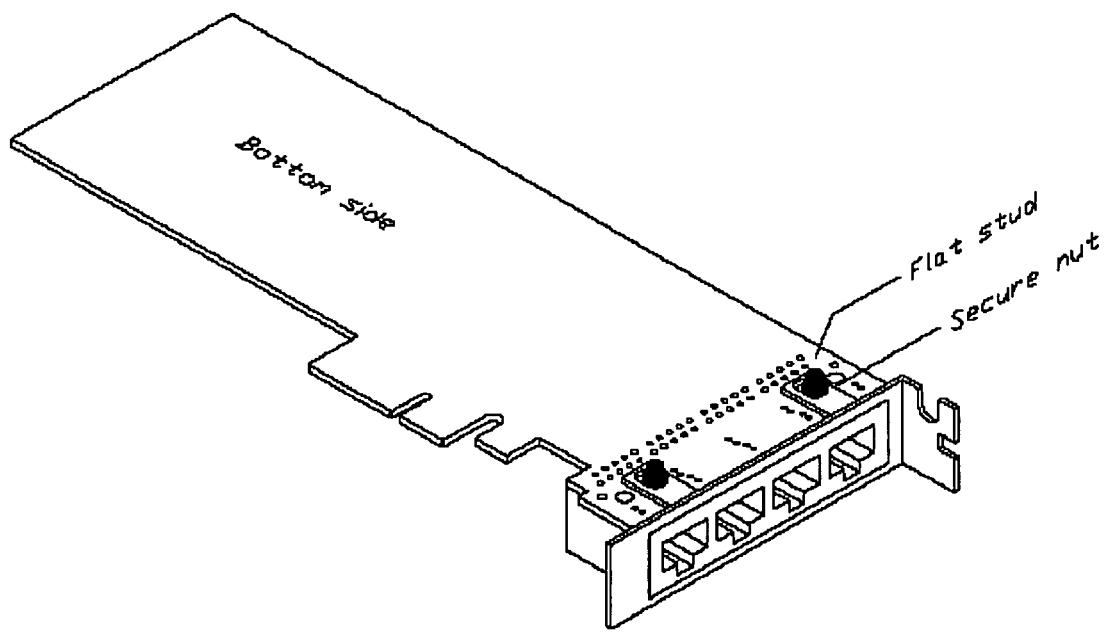
Figure 4: Final bottom side

LOW-PROFILE PCI ADAPTER CARDS WITH HIGH PORT COUNTS

BACKGROUND OF THE INVENTION

PCI (Peripheral Component Interconnect) card provides an easy interface to connect additional devices to a computer motherboard system and fast data transfer among them. Common PCI devices are sound card, graphic card, network card, modem, etc. PCI card utilizes standard PCI Bus specifications, which was initially developed by Intel and is now in charged by PCI-SIG association. There are many versions of PCI Bus standards such as PCI, PCI-X, and the latest PCI-Express.

A common approach for installing multiple PCI cards/ Boards in a computer chassis involves attaching a mounting bracket to each PCI board, and then individually fastens each bracket to the chassis with a screw. Each screw passes through an aperture in the bracket and is secured in a threaded hole in the chassis to clamp the bracket to the chassis.

A conventional PCI card bracket consists of a main panel and two mounting tabs. The main panel usually has several cutouts for external (outside of the chassis) access to the card. On a typical network interface card (NIC), cutouts are made for display LEDs and RJ45 Ethernet connector(s). In high port-count NIC, the RJ45 connector can have 4 or more Ethernet connection ports. There are 2 mounting tabs on the bracket—one at each end. Each tab has a threaded hole for the mounting screw to attach the bracket to the printed circuit board (PCB).

A bracket is attached to a NIC by first sliding it toward the board until the LEDs and the network port connector(s) slip through their corresponding holes on the main panel of the bracket. In this position, the mounting tabs will lie on the top side of the board. Screws are then inserted into the threaded holes on the tabs and go through the mounting holes on the board. Finally, nuts are tightened on the other end of the screws to secure the bracket to the board. In lower cost design, the threaded holes on the tabs can also act as securing nuts for the screws.

Because the current approach for mounting a bracket to a PCI NIC utilizing normal screws, the screw heads occupy board space of the top side that could have been used by other components. This is especially true in the case of a 4-port PCI NIC in small low profile form factor (see FIG. 1) or 6-port in standard height form factor. To ease the illustration only small low profile form factor is shown below. In this case, the board width, by low profile PCI standard, is just wide enough to fit a 4-port RJ45, let alone the space for the mounting tabs, mounting holes in the PCB and bracket screws to keep the board mechanically stable.

SUMMARY OF THE INVENTION

In one embodiment, a PCI card includes upper and lower surfaces; a mounting hole defining first and second holes, the first hole having a larger diameter than the second hole; a stud that is inserted into the mounting hole and flushed to the upper surface; and a port connector provided on the stud to minimize space consumption.

BRIEF DESCRIPTION OF THE DRAWINGS

FIGS. 1-4 illustrates a low-profile PCI card according to one embodiment.

DESCRIPTION OF SPECIFIC EMBODIMENTS

The present invention relates to a PCI card that has a low-profile (or small form factor) and is configured to provide a plurality of ports. In one embodiment, the PCI card is configured to provided a 4-port RJ45 connector on a low profile PCI board as shown in FIG. 1. The present PCI board/card uses a new method of mounting the bracket to minimize the board space consumption, while maintaining the mechanical and electrical integrity of the bracket-board connection.

To eliminate the board space waste from the screw heads, KFH-type studs are employed in the present embodiment. Other types of stud may be used in other applications. KFH-type stud has a flat head and a threaded shaft, whose diameter is usually smaller than that of the head. One end is secured in a tapped hole, and the other is used with a nut. The stud head's thickness is thinner than the board's (i.e. less than 62 of a thousandth of an inch) so that the head can be embedded entirely inside the board. Mounting tabs are also placed on the back of the board (instead of on the top of the board in the normal method), between the electrical pins of the RJ45 connector to optimize board space usage.

Mounting holes on board are redesigned to accommodate the studs. Instead of original through hole, the present mounting hole includes two overlapping holes with same center. The first hole has the same diameter with the stud head, and its depth corresponds to the thickness of the head (from the board's top side). The smaller second hole with diameter of the stud's shaft is drilled from the end of the first hole through the rest of the board's thickness. The mounting holes are placed clear of the pins of the RJ45 connector. They are plated so the stud's taps can be embedded in the plating and secure the studs from moving in circular direction.

The studs are assembled along with the RJ45 component. For example, they are permanently glued or soldered into the board even when bracket is not present.

The 4-port RJ45 connector is placed on top of the studs to minimize the space consumption.

In the conventional process, screws are inserted only after the bracket slides to its final position, i.e., when all the components fit into their cutouts on bracket's main panel. In a process according to the present embodiment, the studs are inserted first and then the bracket is secured to the studs.

The bracket has one or more through holes that are sued to secure the bracket to the board and the port connector. The through holes are defined on one or more bends or tabs. The through holes are elongated or oval to allow a lateral movement of the bracket (see FIG. 2) That is, the bends of the bracket is insert into the assembled studs, and then the bracket is slid into the mounted RJ45 connector. As shown in FIG. 2, the bends/tabs are configured to be attached to the bottom surface of the board/card.

The embodiments above illustrate low profile PCI cards (including PCI, PCI-X and PCI-Express). The present invention, however, may also be used in standard-height PCI cards to provide higher port-count connector.

According to one embodiment, the bracket, studs, and PCB board mechanical assembly includes of two major steps:

Step 1: Top side assembly as illustrated in FIG. 1

Insert the flat studs into the 2 mounting holes such that the head of the stud is flat with the PCB board. Glue or solder may be added to keep the stud more secure in place.

Lay the 4-port RJ45 connector on top of the studs with the connector's pins inserted into all of its corresponding signal holes and leg holes on the board.

Solder all RJ45 connector's pins to permanently secure it on the board.

Step 2: Bottom side assembly as illustrated in FIG. 2

Insert the bracket's mounting holes into the studs already assembled on the board Gently push the bracket toward the RJ45 connector until the connector completely fits in the rectangular cut out on the bracket. This connector in the cut out also acts as a holding beam absorbing the mechanical stress when the board is lifted out of or pushed into the system's PCI connector.

Screw the nuts on the studs to secure the bracket to the board.

FIGS. 3 and 4 show the top and bottom views of the final form of the completely assembled board and the new design bracket. The method above describes the assembly process for the RJ45 connector. But similar method can also be applied to other types of connectors in small or restricted amount of space.

The present invention has been described in terms of specific embodiments. Various modifications may be made to the embodiments above without departing from the scope of the present invention. The invention should be interpreted using the appended claims.

What is claimed is:

1. A PCI card, comprising:
upper and lower surfaces;
a mounting hole defining first and second holes, the first hole having a larger diameter than the second hole;
a stud that is inserted into the mounting hole and flushed to the upper surface; and
a port connector provided on the stud to minimize space consumption.

2. The PCI card of claim 1, wherein the first and second holes are concentric circles.

3. The PCI card of claim 1, wherein the first and second holes are not perfect circles.

4. The PCI card of claim 1, wherein the stud has a flat head.

5. The PCI card of claim 1, further comprising a bracket including a bend whereon a through hole is defined.

6. The PCI card of claim 5, wherein the through hole has an elongated shape to allow a lateral movement of the bracket once the through hole of the bend is inserted into the stud.

7. The PCI card of claim 6, wherein the bend is configured to be attached to the lower surface of the card.

8. A peripheral component interconnect (PCI) adapter card, comprising:
a board having at least one mounting hole;
a securing component having a head and a shaft, the shaft being configured to be inserted into the mounting hole;
an Ethernet connector having a plurality of ports and provided directly over the stud and the mounting hole; and
a mounting bracket which slides through the Ethernet connector and attach the Ethernet connector to the board,
wherein the securing component secures the bracket to the board.

9. The adapter card of claim 8, wherein securing component is a stud having a flat-head that is flushed to the board.

10. The adapter card of claim 8, wherein the bracket has a tab having an elongated hole to receive the shaft of the securing component.

11. The adapter card of claim 8, wherein the Ethernet connector is a 4-port RJ45 Ethernet connector, wherein the securing component is a screw, wherein the Ethernet connector is secured to the board by soldering pins of the Ethernet connector to the board.

12. The adapter card of claim 11, wherein the head of the securing component is flat.

13. The adapter card of claim 12, further comprising a secure nut to receive the shaft of the securing component and secure the bracket to the board.

14. The adapter card of claim 13, wherein the board has at least two mounting holes and two securing components.

15. The adapter card of claim 11, wherein the card is a low profile card, the board width being no more than 2.535 inches.

16. The adapter card of claim 11, wherein the Ethernet connector having a length of more than 2.21 inches but less than 2.535 inches.

17. The adapter card of claim 16, wherein the stud is flushed to a surface of the board.

18. The adapter card of claim 8, wherein the mounting hole includes first and second holes having different diameters to enable the head of the securing component to be flushed to a surface of the board.

19. The adapter card of claim 18, wherein the second hole being provided below the first hole and having a smaller diameter than that of the first hole.

20. The adapter card of claim 8, wherein the mounting hole is provided between pins of the Ethernet connector.

21. The adapter card of claim 8, wherein its first cut-out on the card's lower edge is of a stepping-stool form or smaller rectangular cut-out form than the normal PCI-standard rectangular form.

22. The adapter card of claim 8, wherein the board has a notch at a given distance from an end of the board, the given distance being at least a width of the Ethernet connector.

23. A method of assembling a peripheral component interconnect (PCI) adapter card, the method comprising:
providing a board having at least one mounting hole;
inserting a securing component into the mounting hole;
placing an Ethernet connector directly over the stud and the mounting hole; and
securing the Ethernet connector to the board by soldering its pins to the board, and
securing the bracket to the board using the securing component.

24. The method of claim 23, wherein the securing component includes a head and a shaft, wherein the bracket is secured to the board by inserting the shaft of the securing component into a nut.

25. The method of claim 24, wherein the bracket has at least one tab having an elongated hole, wherein the securing-the-Ethernet-connector step includes sliding the bracket laterally toward the stud, so that the cut-out on the bracket fits into the Ethernet connector and the tab on the bracket can be firmly attached to the board with the nut on the bottom side of the board.

* * * * *